L. A. SCOWDEN.
WATER-REGULATOR.
No. 190,911. Patented May 15, 1877.
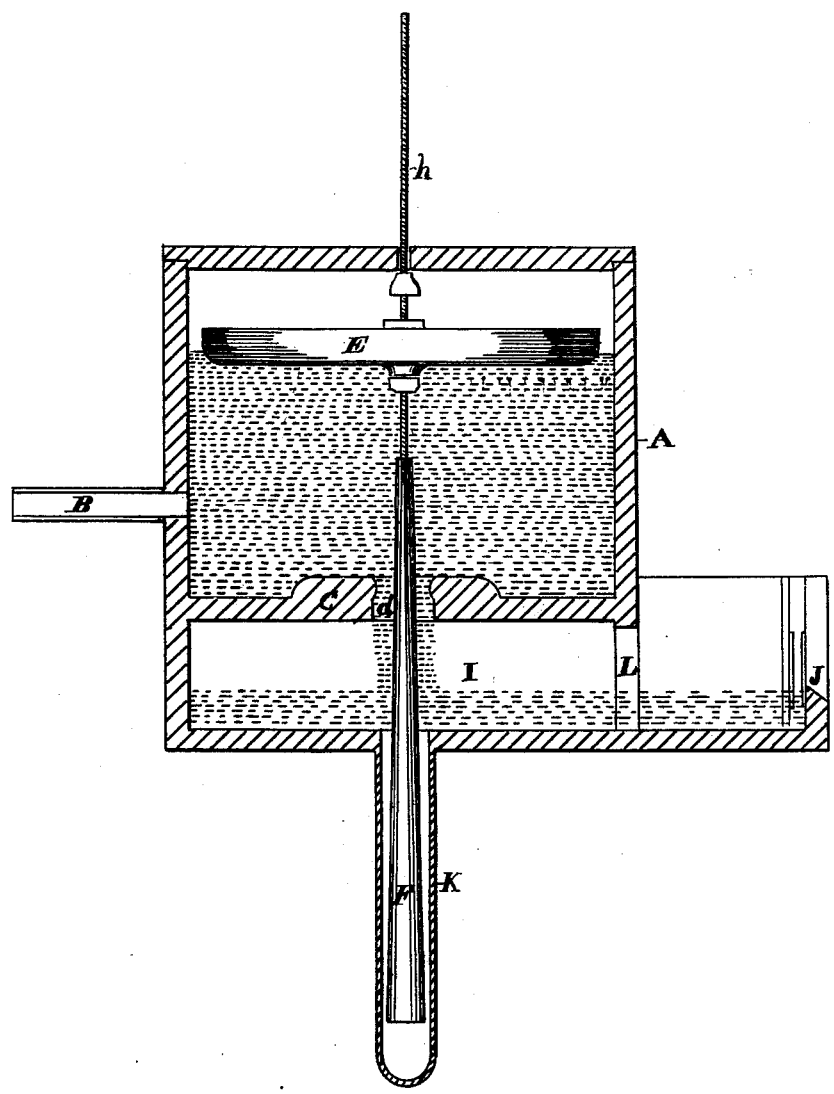

UNITED STATES PATENT OFFICE.

LEO A. SCOWDEN, OF SAN FRANCISCO, CALIFORNIA.

IMPROVEMENT IN WATER-REGULATORS.

Specification forming part of Letters Patent No. 190,911, dated May 15, 1877; application filed October 14, 1876.

*To all whom it may concern:*

Be it known that I, LEO A. SCOWDEN, of the city and county of San Francisco and State of California, have invented an Improved Device for Regulating a Uniform Flow of Water; and I do hereby declare the following to be a full, clear, and exact description thereof, reference being had to the accompanying drawings.

My invention relates to an improved device for automatically regulating the area of an opening through which water is drawn from a reservoir or other source, so that the quantity of water which passes through the opening will be constant and unvarying under the fluctuations or rise and fall of the water supply or source.

My invention is especially adapted for gaging the quantity of water to be supplied from a ditch, river, reservoir, or other source, to customers, for irrigation purposes, and I have therefore represented it in connection with a tank or box, in the sides of which are suitable entrance and exit openings, so that the water is first admitted into the tank or box, and gaged as it passes through it, all as hereinafter specified.

Referring to the accompanying drawings, Figure 1 is a vertical section of my device.

Let A represent a box, tank, or other vessel, into the upper part of which water is allowed to flow through a pipe, B, or other conduit. Across this box, near its bottom, I make a horizontal partition, C, in which, at some suitable point, I make a hole or opening, *d*. This hole or opening may be round, square, or any other desired shape.

E is a float, from which I suspend a tapering or conical rod, F. This tapering rod I make to correspond in form with the shape of the opening *d*, and it is suspended from the float, so that its largest end will be downward or farthest from the float, as represented.

Now, when the float rests upon the surface of the water the rod F will pass down through the opening *d*, and leave only a space around the rod for the water to pass through. As the water rises, the float is carried upward so a larger diameter of the rod F is brought opposite the opening, thus decreasing the area of the space or water-passage as the height of the water and the consequent pressure increases, so that the same quantity of water will pass through the reduced opening, on account of the increased pressure as passed through the larger opening under the reduced pressure. Thus as the water rises and falls the size of the opening or area of the water-passage is enlarged or reduced in a reverse ratio, thus providing an automatic adjustment of the conical rod so as to provide a continuous flow of water in uniform quantity under the varying pressures produced by changes in the level of the water in the tank.

The tapering rod or center F I usually suspend from the float by means of a screw-rod, *h*, which forms an extension of the rod F, and projects upward from its smallest end. The float E I then secure upon this screw-rod, so that it can be adjusted up or down, as desired, to give a greater or less flow of water. The upper end of this extension-rod projects sufficiently above the float to pass through a hole in the top or cover of the box A, by which it is guided and the position of the float and rod F maintained.

The chamber I, below the partition C, receives the water after it descends through the water-opening, and from this chamber it passes out at one side of the bottom through an opening, L, and thence over a dam or weir, J, which indicates the quantity of flow by the depth of the water over it.

As the rod F extends a considerable distance below the partition C, and it is not desirable to make the chamber I of sufficient depth to receive it, I shall usually attach a tube, K, to the bottom of the box, directly below the opening *d*. The lower end of this tube I close, so that no water shall escape, and in setting the box I dig a pit or hole for this tube to fit in, so that the rod F will move up or down in this tube; but other means could be employed for the same purpose.

By this means I provide an extremely simple device for regulating the area of the water passage automatically, so that a constant and uniform quantity of water will pass through it at all times independent of the height of the water in the box and consequent pressure.

Having thus described my invention, what I claim, and desire to secure by Letters Patent, is—

1. The combination of a conical or tapering rod, F, with a float, E, for automatically regulating the area of a water passage or opening, d, so as to preserve a fixed, permanent, and uniform discharge of water through said opening, independent of the fluctuation in the height of the water, substantially as and for the purpose above described.

2. The box or tank A, provided with the ingress-passage B, and having the partition C with its opening or water-passage d, and also provided with an outlet-passage, L, below the partition, in combination with the tapering rod F, suspended from a float, E, so as to automatically regulate the area of the water in the tank, and thus preserve a uniform discharge of water from the upper into the lower compartment of the tank, substantially as above specified.

In witness whereof I have hereunto set my hand and seal.

LEO A. SCOWDEN. [L. S.]

Witnesses:
 OLWYN T. STACY,
 FRANK A. BROOKS.